April 22, 1958 — J. E. ROOKUS — 2,831,680
DEMOUNTABLE HUB FOR FILM STORAGE REELS
Filed Sept. 12, 1955 — 2 Sheets-Sheet 1
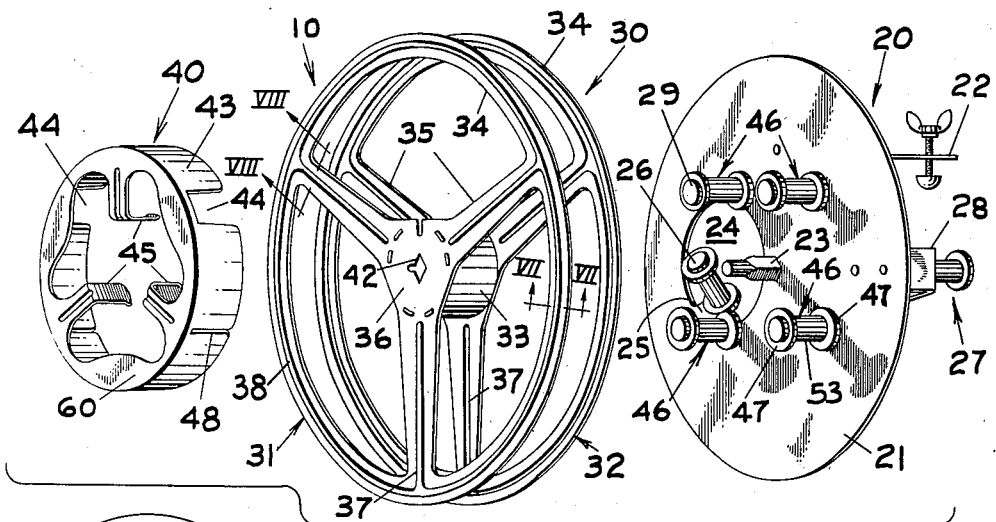
Fig. 2
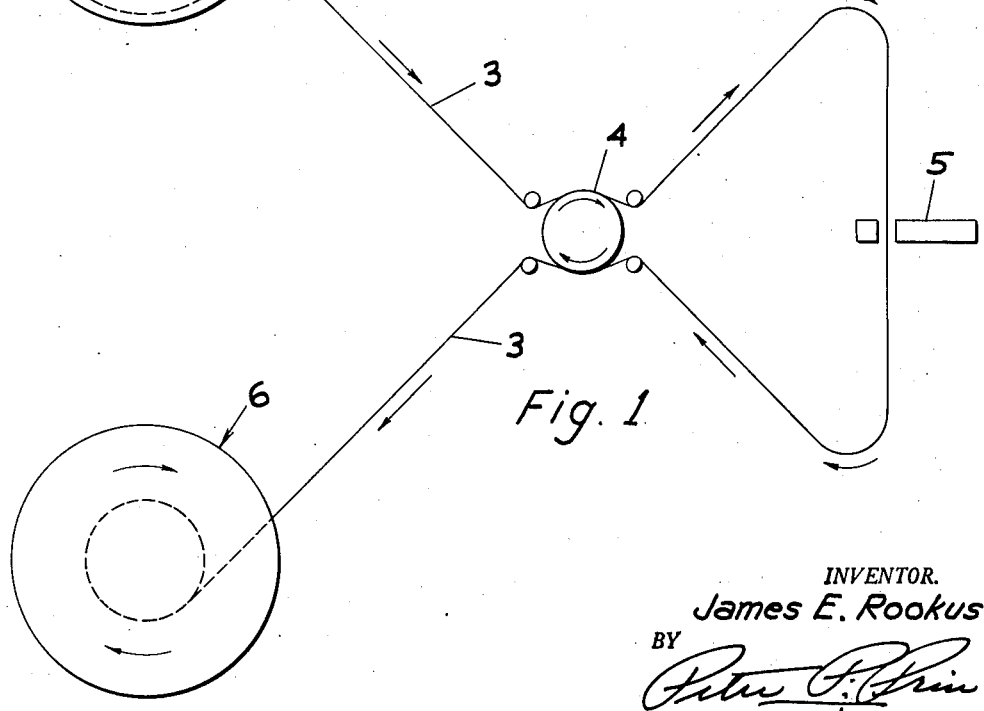
Fig. 1
INVENTOR.
James E. Rookus
BY
ATTORNEY April 22, 1958 J. E. ROOKUS 2,831,680
DEMOUNTABLE HUB FOR FILM STORAGE REELS
Filed Sept. 12, 1955 2 Sheets-Sheet 2
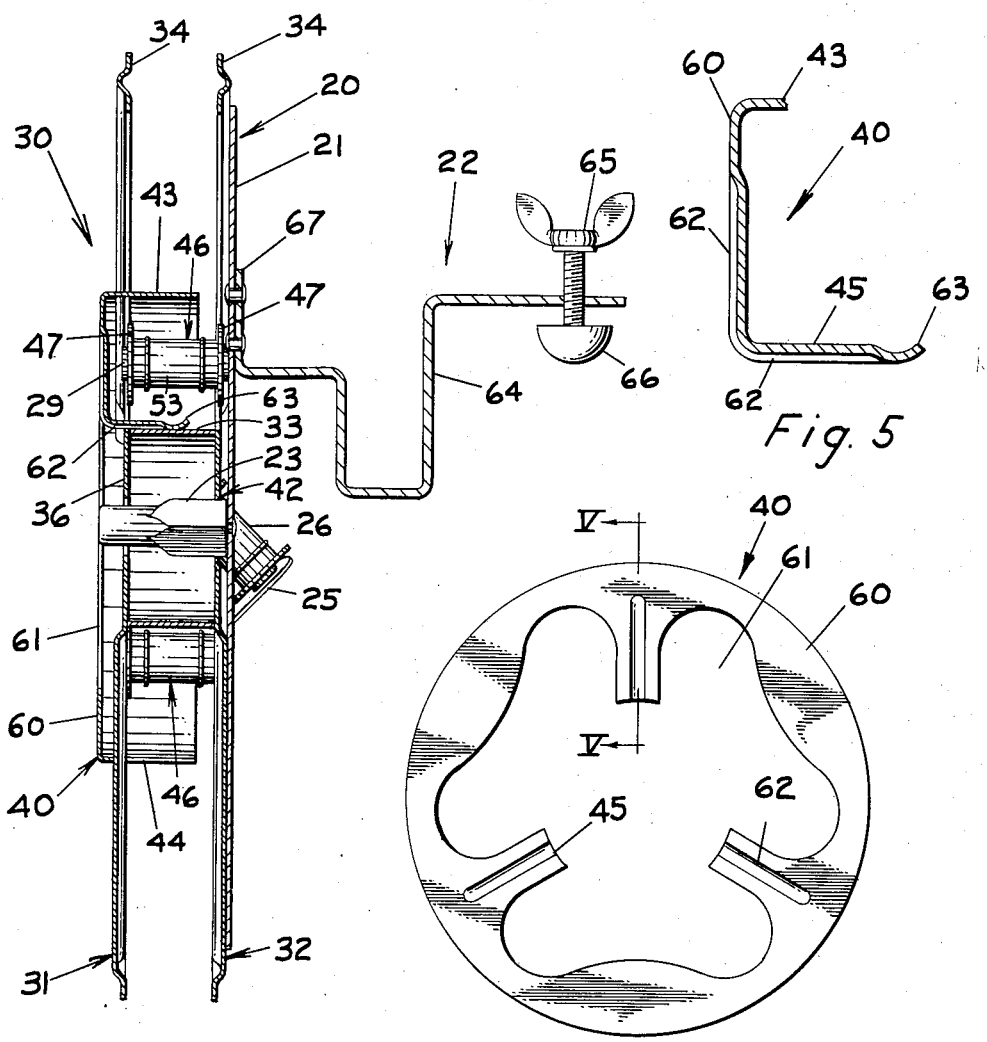
INVENTOR.
James E. Rookus
BY
ATTORNEY

United States Patent Office 2,831,680
Patented Apr. 22, 1958

2,831,680

DEMOUNTABLE HUB FOR FILM STORAGE REELS

James E. Rookus, Grand Rapids, Mich.

Application September 12, 1955, Serial No. 533,777

3 Claims. (Cl. 271—2.17)

This invention relates to motion picture projecting equipment and more particularly to the structure of a demountable hub for a film storage reel adapted to be utilized on a dual directional film reel from which film can be withdrawn and upon which film can be wound during projection.

Motion picture projecting equipment is usually provided with a pair of shafts, one which is driven and causes the reel mounted thereon to roll up the film on its hub after the film has passed the projecting lens. Another reel is mounted for free rotation on the other shaft and from this reel the strip of film is withdrawn for projection. On this conventional type of equipment the film on the supply reel is drawn from the outside of the film coil, wrapped on the reel hub, and is stored on the driven reel by coiling the film upon itself about the hub of the reel.

This operation results in a reversal of the strip of film end for end, whereby it is necessary to rewind the film before it can be projected again. This rewinding operation is carried out at a relatively high velocity resulting in appreciable wear on the film. Furthermore, the rewinding operation is a time consuming and annoying procedure.

My recently issued Patent No. 2,672,336 shows a mechanism operating upon the inside winding principle. With this mechanism, the projected film is wound upon a removable hub, called a conversion cap, concentric with and spaced from the hub of the reel. The film is supplied to the projector by withdrawing the conversion cap from the inside of the film reel whereby the inside end of the film can be withdrawn and the film be projected from its lead end. The fact that the film was reversed during the winding operation, thus, becomes unimportant. This not only eliminates the wear inherent in the winding operation but it also eliminates the time necessary for rewinding and makes the film immediately available for reshowing.

The mechanism of my Patent No. 2,672,336 includes a support member adapted to be affixed to the shaft of a conventional projector, which shaft normally mounts the supply reel of film. This support is equipped with several film support rollers rotatably mounted and projecting from it. The support member also has an inclined roller for guiding the film as it is withdrawn from the inside of the film coil. The film passes from the inclined roller to guide means which aligns the film with the conventional equipment for moving the film past the projection lens. On this support is also mounted a non-rotatable disk type reel consisting of an outer, circular disk, an inner circular disk concentrically joined by a small tubular hub. These disks are provided with several openings through which the rollers, extending from the support member, are adapted to pass to permit the reel to be mounted on the support member. The inner disk, immediately adjacent the support member, also is provided with an opening for the inclined roller previously described. The outer disk also has an enlarged opening serving as an access opening for threading the film when the reel is mounted for unwinding. A removable cap is provided to support the film as it is being wound upon the reel. This cap is removed when the reel is placed in feeding position. The film is withdrawn from the center of the coil.

I found that although the equipment disclosed in my Patent Number 2,672,336 works comparatively well, a greatly improved mechanism is made possible by a novel type of removable cap. This cap forms the subject matter of this invention.

It is therefore a primary object of this invention to provide an improved conversion cap which provides the support for the film as it is being coiled on the reel.

Another object of this invention is to provide a conversion cap for a dual directional film reel, such cap being easier to insert on and withdraw from the reel.

Still another object of this invention is to provide a conversion cap for a dual directional film reel permitting withdrawal of the cap with a minium of disturbance to the coiled film.

These and other objects and advantages of my invention will be immediately seen by those acquainted with the design and construction of photographic equipment. Upon reading the following specification in conjunction with the accompanying drawings wherein:

Fig. 1 is a diagrammatic presentation of the path through which the film travels as it passes through the projector.

Fig. 2 is an oblique exploded view of the dual directional film mechanism.

Fig. 3 is a central sectional elevation view of the assembled mechanism of Fig. 2.

Fig. 4 is a face view of the conversion cap of this invention.

Fig. 5 is a sectional view of the conversion cap taken along the plane V—V of Fig. 4.

Fig. 6 is a fragmentary rear elevational view of the support member with the film threaded and ready for projection.

In executing the objects and purposes of this invention, I have provided to be utilized in the dual directional film reel mechanism described in my patent application entitled Film Storage Reels, filed simultaneously herewith, a novel type of conversion cap on which the film is initially coiled before it is assembled along with the other mechanism in order to withdraw the film from the inside of the roll. This conversion cap is cup shaped and includes a face having circular peripheral flanges extending therefrom a distance substantially equal to the width of the film reel. These flanges have spaced slots to permit the flanges to extend through the openings in the inward side of the film reel. In my preferred form, the conversion cap is adapted to be inserted on a spoked reel. Thus, the slots in the flanges are adapted to receive the spokes. The conversion cap has a plurality of fingers extending in the same direction as the flanges. These fingers are adapted to grip the hub of the reel. Thus, the cap can be easily inserted on and withdrawn from the reel without rotation.

In the following description the terms "inwardly" and "outwardly" will be frequently used and are to be taken to mean "inwardly" toward the projector or to the right as the device appears in Fig. 2 and "outwardly" away therefrom, except where preceded by the word "radially." The terms "forwardly" and "rearwardly" are also freely used and are to be taken to mean "forwardly" towards the projection lens of the projector to the left of Fig. 4 and "rearwardly" away therefrom.

In the drawing, the numeral 1 indicates a film supply reel from which a strip of film 3 passes to a driving mechanism 4 and then past a projection optical system 5. The film returns to engage the driving mechanism 4 and is finally wound upon a driven reel 6. The indicated path of travel of the film is one of many different arrangements which are conventionally employed, all of which may be used with my invention. The reels employed by my invention may be used for either feeding or receiving the film and may be mounted without modification on the shaft provided for these reels on standard projectors.

In accordance with this invention the reel mechanism shown in Fig. 2, when utilized as the film supply reel, has the film withdrawn from the inside of the reel. This is accomplished by the film mechanism 1 shown in Fig. 2, including the support 20, reel 30, and the conversion cap 40.

The reel 30 consists of an inner side element 31 and an outer side element 32 concentrically joined by a small, tubular hub 33. The inner and outer side or marginal elements are identical and spaced apart sufficiently that a strip of film of the size for which the reel is adapted may be received between them without contact with either side element. Each of the side elements 31 and 32 includes the circular rim 34 having the spokes 35 extending radially inwardly toward the center axis of the rim and joined together at the hub portion 36. The spokes 35 and rim 34 each have a reinforcing raised bead or rib 37 and 38, respectively, which serve the purpose of reinforcing the members. The hub portions 36 of side elements 31 and 32 have a square central aperture 42 of such a size that the reel 30 may be mounted directly on the non-circular, spool shaft of any conventional projector.

The conversion cap 40 of this invention is shown in more detail in Figs. 2, 3, 4, and 5. It is cup shaped and has an apertured circular face 60 with a circular, peripheral flange 43 normal to the face 60 (Figs. 2 and 3) extending therefrom axially inwardly toward the support member 20. The flange 43 is provided with three equally spaced notches or slots 44. Each of the notches 44 is of sufficient width to receive one of the spokes 35 of the reel 30. The notches 44 are of such depth that the face of the cap 40 will almost seat against the spokes 35 (Fig. 3). Thus, when the reel, with the conversion cap 40 in place, is mounted on the receiving spool shaft of a conventional projector, the film will roll up on the flange 43.

The face 60 has an aperture 61. The aperture 61 is shaped to provide three fingers 45, bent axially inwardly in the same direction as flange 43. The configuration of the aperture 61 contributes to the strength of the conversion cap 40. The aperture 61 is shaped somewhat similar to a three-leaf clover. It could also be described as forming three similar heart shaped openings if the fingers 45 were bent flush with the face 50.

Fingers 45 are formed with reinforcement beads 62 on the top flat surface and on the portion extending inwardly toward the support plate 21. The ends of the fingers are rounded to facilitate mounting of the cap on the hub 33. The diameter of the hub 33 is such as to cause slight spreading of the fingers 45. The fingers 45 are located within the area defined by a concentric circle having a diameter slightly less than that of the hub 33 of the reel 30. Thus, the fingers when pushed on the reel are biased outwardly and grip the hub 33. The fingers 45 are spaced one from the other so that they will fit between the spokes 35. Thus, they are located between the spoke receiving slots 44. The fingers 45 extend a sufficient distance inwardly toward the support plate 21 to provide sufficient bearing surface against the hub 33.

Conversion cap 40 has axial slits 48 in the circular flange 43 provided to allow expansion of the circular flange. This slit 48 in allowing expansion of the flange 43 facilitates a tighter fit on the rollers 46, thus contributing to the overall rigidity and strength of the unit. It also contributes to the flexibility of the fingers 45 and thus to the securement of the conversion cap 40 on reel 30.

An advantage of the conversion cap of this invention over the cap shown in my Patent Number 2,672,336 is that it is adapted to be pulled straight off of the reel 30. In my old type conversion cap the cap had to be turned in order to secure it to the reel 30. Thus, it had to be turned when the cap was withdrawn after the roll of film had been wound on it. This often caused damage to the end of the film and sometimes resulted in binding, jamming, and tearing of the film caused by the misarrangement of the film due to the turning of the cap when the film was mounted on it. With the conversion cap of this invention, the cap is withdrawn directly and straight off from the reel thus eliminating any danger of misarrangement or wear on the film caused by the turning of the cap with the film rolled on it. The side slots of my old conversion cap were also expensive to fabricate. The fabrication of the conversion cap of this invention is relatively inexpensive.

After the film has been wound on the cap 40 in its position in the reel 30, the film 3 is removed therefrom by mounting it on the support 20 which includes a circular plate 21 preferably of the same size as the reel 30. The plate 21 has mounting means 22 on its inward face for mounting the support 20 on the bracket of the projector. This mounting means is described more thoroughly in my Patent Number 2,672,336. Briefly, it comprises the ear 67 and the U-shaped portion 64 having holes therein (not shown) through which the shaft of a conventional projector can be inserted. The wing screw 65 having the rubber end 66 is adapted to be tightened so that the rubber end 66 secures the support 20 more rigidly to the projector shaft. An outwardly extending shaft 23, circular at its end but square at its base is mounted at the center of the plate 21 for receiving the reel 30. The base of the shaft 23 is square for engaging the aperture 42 of reel 30 to prevent rotation of the reel 30.

Adjacent the shaft 23, but to the rear thereof, is an opening 24, into the lower end of which projects an inwardly directed upwardly inclined lip 25. The inward inclination of the lip 25 is preferably about 45°. The lip 25 is also upwardly inclined in rearward direction but at a minor angle. This lip supports a shaft perpendicular thereto. An exit roller 26 is mounted on the shaft for free rotation. The roller 26 extends through the opening 24 with approximately one half thereof on each side of the plate 21. When the plate 21 is mounted on the projector, the roller 26 is to the side of the shaft 23 away from the optical system 5.

Mounted to the plate 21, opposite the roller 26 and adjacent the forward periphery of the plate 21, are the aligning rollers 27 (Fig. 6). The aligning rollers 27 are mounted for free rotation on shafts secured to the U-shaped lip 28. This entire structure is shown and described in more detail in my Patent No. 2,672,336. It will be seen, however, from the drawings that the axes of the rollers 27 are horizontal. The rollers 27 are aligned with the film track of the projector.

From the outward side of plate 21 project four rods 29 arranged in a circle of lesser diameter than that of cap 40. On each of the rods 29 is mounted, for free rotation, a roller 46 having a length substantially equal to the spacing between the outer side element 31 and inner side element 32. The rollers 46 have a flange 47 on each end. The flanges 47 are spaced apart by a shank 53 of proper width to seat the size film for which the reel is designed. The roller 46 may be made with flanges of different thickness to provide a shank of the correct width for the size film with which the reel is going to be used. Thus, the reel may be adapted to either 8 or 16 millimeter film. These flanges 47 are tangent to a circle having substantially the same diameter as the inner face of the flange 43 of the cap 40.

The various parts of my invention may be made from any suitable material. Preferably, the cap 40 and reel 30 are fabricated of aluminum or steel. It is important that fingers 45 be made of resilient material. The rollers 27 and 46 are preferably made from brass or plastic to reduce wear. They are each so made and mounted that they may rotate freely and will impose a minimum of drag upon the film 3.

*Operation*

The operation of this mechanism is exactly like that described in my Patent No. 2,672,336 except an improved device is obtained by the use of the conversion cap 40 described herein. Thus, to wind the film on my reel, the reel may first be used as a driven reel 6 upon which the film is wound after passing the optical system 5. Before so using the reel, the cap 40 is installed. This is accomplished by aligning the fingers 45 with the periphery of the hub 33 of the reel and the slots 44 with the spokes 35. Then the cap 40 is pushed axially on the hub 33 of the reel 30. When the fingers 45 engage the hub they are flexed or bent slightly outwardly. Thus, sufficient stress is exerted on them to create adequate bearing pressure against the hub 33 for securing the cap 40 on the reel 30. The rounded ends 63 prevent possible bending between the fingers and the hub 33. When mounted on the reel 30, the flange 43 provides a hub upon which the film is wound. Upon operation of the projector, the film 3 is coiled within the reel in the same manner as in any conventional reel.

When all the film has been wound on the reel, the reel is removed and placed upon the support 20 by seating it upon the shaft 23 with the inner side element 32 abutting the plate 21. Engagement between the square hole 32 and the square portion of the shaft 23 holds the reel against rotation with respect to the plate 21. The size of the cap 40 is such that it will fit around the rollers 46 just barely touching the flanges 47. Thus, the coil of the film may be easily passed over the rollers 46 without snagging.

The cap 40 is now pulled axially from reel 30. This is a simple and easy operation since it is not necessary to turn the cap before removing it from the reel with the film rolled on it. Furthermore, as previously described, the film is not worn by the turning action of the hub.

Removal of the cap 40 frees the coil of film 3 which adjusts itself to seat upon the top pair of rollers 46. The inner end of the film remains free for threading over the exit roller 26 and for unwinding from the inside of the coil.

The inclination of the exit roller 26 causes the plane of the film to rotate approximately 45° between the last roller 46 over which it passes and the exit roller 26. The film 3 makes approximately a 180° turn about the exit roller 26 and travels forwardly toward the guide rollers 27. As the film passes from the exit 26 to the guide rollers 27 its plane is again rotated 45° in order to compensate for the initial 45° rotation given to the film inside the reel. The rotation of the film between the exit roller 26 and the guide rollers 27 returns the film to its former horizontal plane with the same face up. By mounting the exit roller 26 on approximately a 45° angle inclination and having it extend a substantially equal distance on each side of the plate 21, the film is guided out of the reel without successive rotation about its center axis.

The film passes over the forward one of the guide rollers 27, making approximately a 200° bend and thereby reversing its direction. The film then passes over the rearward one of the rollers 27 making approximately a 180° bend. As the film leaves the second of the rollers 27 it is aligned with the film track of the projector and thereafter traces substantially the same path it would have traced had it been withdrawn from the conventional rewound reel.

It will be recognized that the reel of this invention may be used either for inside unwinding or in the conventional manner. This is made possible by the conversion cap described herein, which is designed to have the film wound on it and be removed so that the film can be withdrawn from the mechanism from the inside of the film roll.

While I have shown and described a preferred embodiment of my invention, it will be recognized that numerous modifications of my invention may be made, each without departing from the principle of my invention. Each of these modifications should be considered as included in the hereinafter appended claims unless these claims by their language expressly state otherwise.

I claim:

1. In a leading mechanism for unwinding a roll of tape from the inside thereof, said mechanism comprising: a vertical support; means for holding said support stationary; rotatable means arranged in a circle and mounted to the outward face of said support adapted to permit said roll of tape to be rotatable with respect to said support and adapted to permit an end of said tape to be withdrawn from the inside of said roll; exit means for receiving and directing said end outside the area defined between said rotatable means; a spoked wheel mounted against the outward face of said support and concentric with said rotatable means, said reel having a hub; a cup-shaped cap having a face; a circular peripheral flange extending inwardly from said face and having slots adapted to receive said spokes to permit said flanges to project into said reel and form a second hub concentric with the reel's hub; said flange having a diameter defining a circle substantially tangent to the radially outward periphery of said rotatable means; and spring like fingers extending inwardly from said face and spaced from said spokes; said fingers having rounded ends bent slightly radially inwardly and intermediate portions when in unbiased position located within the area defined by a concentric circle having a diameter equal to the hub of said reel whereby when inserted on said reel said fingers are biased outwardly and grip said reel hub.

2. A conversion cap for a reel having a side with openings and a hub, said reel being adapted to be utilized in a loading mechanism for unwinding a roll of tape from the inside thereof, said cap comprising a cup-shaped body having a circular face; a circular peripheral flange extending from said face a distance substantially equal to the width of said reel hub and having spaced slots adapted to permit said flange to pass through said openings; and axially extending fingers projecting from said face and spaced radially inwardly from said flange, said fingers being circumferentially spaced to pass through said openings; said fingers being adapted to grip said reel hub.

3. A conversion cap for a reel having spokes; said reel being adapted to be utilized in a leading mechanism for unwinding a roll of tape from the inside thereof, said cap comprising a cup-shaped body having a circular face; a circular peripheral flange extending from said face a distance substantially equal to the width of said reel hub and having spaced slots adapted to receive said spokes; and axially extending spring like fingers projecting from said face and spaced radially inwardly from said flange; said fingers being spaced to pass between said spokes; said fingers also having ends rounded slightly radially outwardly and intermediate portions when in unbiased position located within the area defined by a concentric circle having a diameter equal to the hub of said reel whereby when inserted on said reel said fingers are biased outwardly and grip said reel hub.

References Cited in the file of this patent
UNITED STATES PATENTS

| | | |
|---|---|---|
| 2,529,501 | Johnston | Nov. 14, 1950 |
| 2,672,336 | Rookus | Mar. 16, 1954 |